(12) United States Patent
Yoshida et al.

(10) Patent No.: US 6,206,147 B1
(45) Date of Patent: Mar. 27, 2001

(54) DISC BRAKE

(75) Inventors: Hirokazu Yoshida; Seiya Odaka; Shinji Aoyagi, all of Tokyo (JP)

(73) Assignee: Akebono Brake Industry Co., Ltd., Tokyo (JP)

(*) Notice: Subject to any disclaimer, the term of this patent is extended or adjusted under 35 U.S.C. 154(b) by 0 days.

(21) Appl. No.: 08/944,638

(22) Filed: Oct. 6, 1997

(30) Foreign Application Priority Data

Oct. 7, 1996 (JP) .................................................. 8-282903

(51) Int. Cl.[7] .................................................. F16D 65/38
(52) U.S. Cl. .................................... 188/73.37; 188/73.36
(58) Field of Search ........................... 188/73.35, 73.36, 188/73.37, 73.38, 250 E, 250 F, 250 G

(56) References Cited

U.S. PATENT DOCUMENTS

| 3,782,510 | * | 1/1974 | Rath ................................ 188/73.35 |
| 4,200,173 | | 4/1980 | Evans et al. ..................... 188/73.3 |
| 4,296,844 | * | 10/1981 | Tamura et al. .................. 188/73.38 |
| 5,236,068 | * | 8/1993 | Nagai et al. ..................... 188/250 G |
| 5,289,903 | * | 3/1994 | Nagai et al. ..................... 188/250 G |
| 5,577,577 | * | 11/1996 | Hrai et al. ...................... 188/73.36 |

* cited by examiner

*Primary Examiner*—Robert J. Oberleitner
*Assistant Examiner*—Robert A. Siconolfi
(74) *Attorney, Agent, or Firm*—Morgan, Lewis & Bockius LLP

(57) ABSTRACT

In a disc brake of the type in which the outer pad is directly supported by the pawls 1*a* and 1*b* of the caliper 1 in a manner that the protrusions 5*b* and 5*c* of the back plate 5*a* of the outer pad 5 are put in engagement with the engaging parts 1*c* and 1*d* of the pawls of the caliper 1, the protrusions 5*b* and 5*c* of the back plate 5*a* of the outer pad 5 and the engaging parts 1*c* and 1*d* of the pawls of the caliper are located on the radially inner side of the surface pressure center C of the outer pad 5.

12 Claims, 5 Drawing Sheets ically noise generated when the brakes are applied,
DISC BRAKE

BACKGROUND OF THE INVENTION

1. Field of the Invention

The present invention relates to a disc brake, and more particularly to a disc brake of the type in which a braking force of the outer pad is directly received by the pawls of the caliper with the aid of the protrusions of the back plate of the outer disc. The disc brake of the invention is capable of minimizing noise generated when the brakes are applied, without the shim for suppressing the noise generation, whereby the cost to manufacture is reduced.

2. Related Art

An overall mechanism of the disc brake of the type in which a braking force of the outer pad is directly received by the pawls of the caliper with the aid of the protrusions of the back plate of the outer pad, will be described with reference to FIGS. 1 and 2.

A back plate $3a$ of an inner pad 3, which is pressed by a piston 2 of a caliper 1, is slidably supported by a support arm 4. An outer pad 5 is pressed by a pair of pawls $1a$ and $1b$ of the caliper 1. The outer pad 5 has a back plate $5a$ having a pair of protrusions $5b$ and $5c$. The outer pad 5 is directly supported by the pawls $1a$ and $1b$ of the caliper 1, with the aid of the protrusions $5b$ and $5c$ of the back plate $5a$ thereof. The protrusions $5b$ and $5c$ of the outer pad 5 are disposed symmetrically with respect to the center line of the caliper 1. The positions of the protrusions $5b$ and $5c$ when viewed in the radial direction (the direction of the radius R of the braking disc D, and the same definition will be applied to the same and equivalent expressions which will appear in the subsequent description of the specification) are determined in consideration with the cutting of holes $1c$ and $1d$ of the caliper pawls $1a$ and $1b$ into which the protrusions $5b$ and $5c$ of the outer pad are fit, the forming of the protrusions $5b$ and $5c$ on the back plate $5a$ of the outer pad 5, and the like. And therefore, protrusions $5b$ and $5c$ are positioned much (e.g., 5 mm) closer to the radially outer periphery edge of the brake disc than the surface pressure center (usually, substantially coincident with the center of the piston 2) of the brake pad. In other words, those protrusions are deviated greatly (distance of 5 mm) to the outer peripheral edge of the disc from the surface pressure center of the disc.

One ($1c$) of the holes $1c$ and $1d$ of the paw is formed as a called clearance hole in order to easily fit the protrusions $5b$ and $5c$ into the holes $1c$ and $1d$ even if manufacturing errors are present on the positions of the protrusions $5b$ and $5c$ and the holes $1c$ and $1d$ of the pawls.

In this conventional disc brake, the inner pad 3 and the outer pad 5 are urged outward or inward in the radial direction, by means of springs 6 and 7, thereby preventing vibrations of those pads, which are due to the vibration of the car body.

Where this disc brake is used, when a braking force is small (the brake pedal is softly depressed), the outer pad vibrates to generate noise, as is known. To suppress the noise, a conventional technique inserts a shim between the pawls $1a$ and $1b$ of the caliper and the back plate $5a$ of the outer pad. The shim is formed with a metal plate covered with hard rubber. In this structure, the vibration of the outer pad is attenuated through the friction between the outer pad and the shim. The structure including the shim can suppress the noise generation to some extent, but cannot completely remove the noise. The work to insert the shim between the pawls and the back plate is troublesome. This leads to an increase of the cost to manufacture.

If the cause of the noise generation is cleared up and a proper measure is taken for the noise generation, there is no need of using the shim and the work to mount the shim. Our study to clear up the cause of the noise generation shows the following facts. 1) Of the holes $1c$ and $1d$, the hole $1c$ is a loose hole, and 2) the outer pad 5 becomes instable and vibrates about the protrusion $5c$ in a plane of the disc brake D parallel to the brake surface. This will be described in detail with reference to FIG. 3.

In the figure, the surface pressure center of the outer pad 5 is denoted as C. The surface pressure center C is the center of the surface pressure of the braking surface pressed by the piston, and substantially coincident with the center line of the piston. The protrusions $5b$ and $5c$ of the outer pad are deviated outward in the radial direction R by a distance E from the surface pressure center C.

As recalled, the hole $1c$ of the pawl $1a$ to which the protrusion $5b$ is to be fit is the loose hole. Therefore, when the protrusion $5b$ is fit to the hole $1c$, the protrusion $5b$ is greatly movable within the hole $1c$.

The brake disc rotates in the forward direction X. In this state, if the brakes are applied, a braking force F acts on the braking surface of the outer pad 5, and the center of its action force is coincident with the surface pressure center C. The reaction force F to the applied braking force F acts on the protrusion $5c$, so that a clockwise moment M(F×E) acts on the outer pad 5. Further, a counterclockwise moment G of the outer pad 5 per se acts on the outer pad. A peripheral speed of a portion on the braking surface of the brake disc, which slidably contacts with a radially outer portion of the outer pad, is higher than that of another portion on the braking surface of the brake disc, which slidably contacts with a radially inner portion of the outer pad. Because of the peripheral speed difference, a force to turn the outer pad acts on the outer pad. This force is the moment G of the outer pad per se. A magnitude of the moment G depends on the shape of the outer pad 5.

A gap L is present between the protrusions $5b$ and $5c$. The protrusions $5b$ and $5c$ restrict the outer pad 5 by a restricting force P. The restricting force P causes a moment Q (=P×L). Among those forces, M−G−Q=0 holds. P is proportional to (G−M)/L. As the braking force F becomes small, the absolute value of the moment M approaches to and is approximate to the absolute value of the moment G. At this time, the restricting force P by the protrusion $5b$ becomes small, and the absolute value of the restricting force P approximates to zero (0). The outer pad 5 loses its stability and minutely vibrates, to thereby generate noise. The above analysis teaches that to remove the minute vibration of the outer pad 5, it is necessary to prevent the outer pad 5 from losing its stability by keeping the restricting force P at a value larger than zero (0).

The hole $1c$ must be formed in the form of a loose hole, for ease of the manufacturing and assembling of the brake disc. To completely remove the noise in question, the necessity is to avoid the occurrence of such a situation that the restricting force P of the protrusion $5b$ that exerts on the outer pad becomes small and a stability of the output pad is lost. And from our analysis, it will be readily seen that to avoid the occurrence of such a situation is effective in solving the noise problem.

SUMMARY OF THE INVENTION

In the above circumstances, the present invention is made to prevent the noise by the outer pad, and has an object to uniquely select the position where the pawls $1a$ and $1b$ supports the outer pad 5 so as to avoid such a situation that in a state where the braking force is small, the restricting force P of the protrusion 5b that exerts on the outer pad becomes small and a stability of the output pad is lost.

Means of the invention to solve the problem is such that the protrusions of the back plate of the outer pad and the holes of the pawls of the caliper into which the protrusions are fit are located on the radially inner side of the surface pressure center of the outer pad.

DESCRIPTION OF THE PREFERRED EMBODIMENTS

Figure 5:
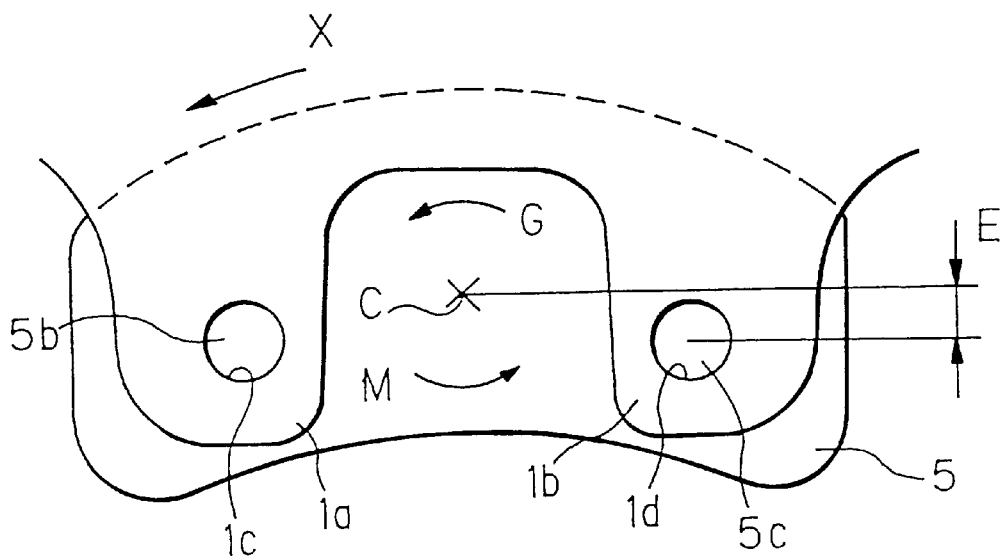
FIG. 5 is a diagram showing an embodiment of a disc brake according to the present invention.

A preferred embodiment of the present invention will now be described with reference to FIG. 5.

In the invention, the protrusions 5b and 5c of the back plate of the outer pad 5 and the holes 1c and 1d of the pawls of the caliper into which the protrusions are fit are located on the radially inner side of the surface pressure center C of the outer pad. The forces to deviate the protrusions 5b and 5c of the outer pad and the holes 1c and 1d of the pawls of the caliper in the radial direction are located on the radially inner side of the surface pressure center C (in the conventional disc brake, the forces are located on the radially outer side of the surface pressure center). Therefore, the restricting force P by which the protrusion 5b restricts the outer pad 5 is (G+M)/L. If the braking force is small, it will never happen that the term (G+M) is approximate to zero (0). Consequently, the invention successfully solves such a problem that when the braking force is small, the restricting force P of the protrusion 5b that exerts on the outer pad becomes small and a stability of the output pad is lost, to thereby generate noise.

Figure 1:
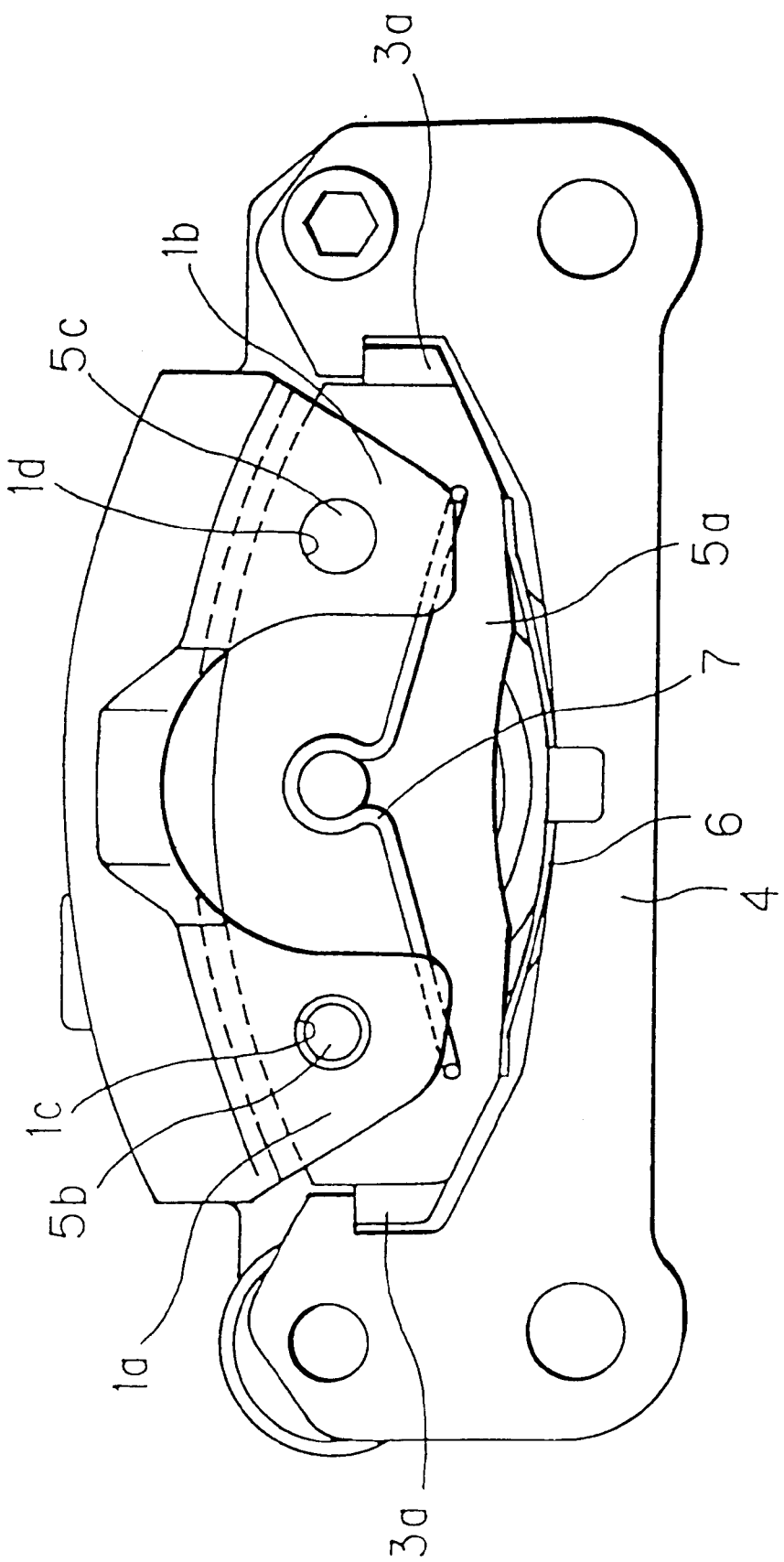
FIG. 1 is a front view showing a conventional disc brake of the type in which a braking force of the outer disc is directly supported by the pawls of the caliper with the aid of the protrusions of the back plate of the outer disc.
Figure 2:
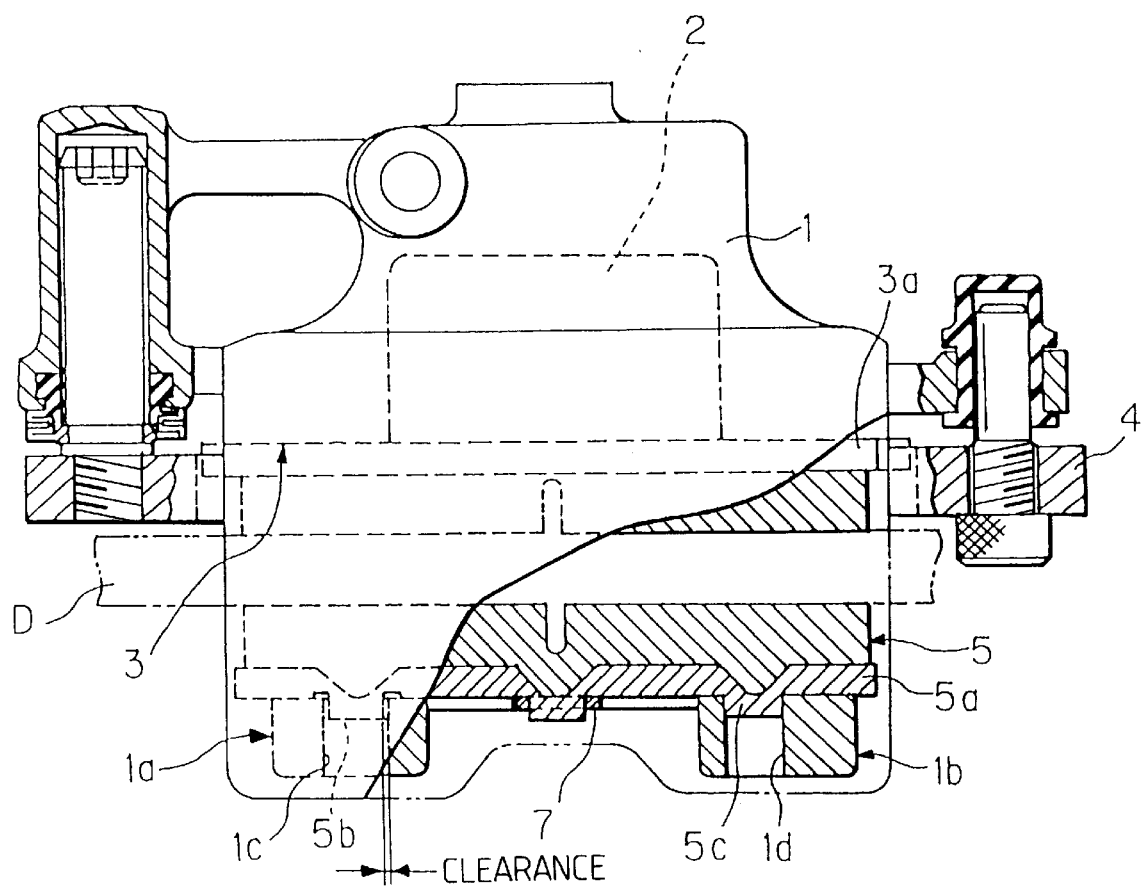
FIG. 2 is a sectional view showing a part of the disc brake of FIG. 1.
Figure 3:
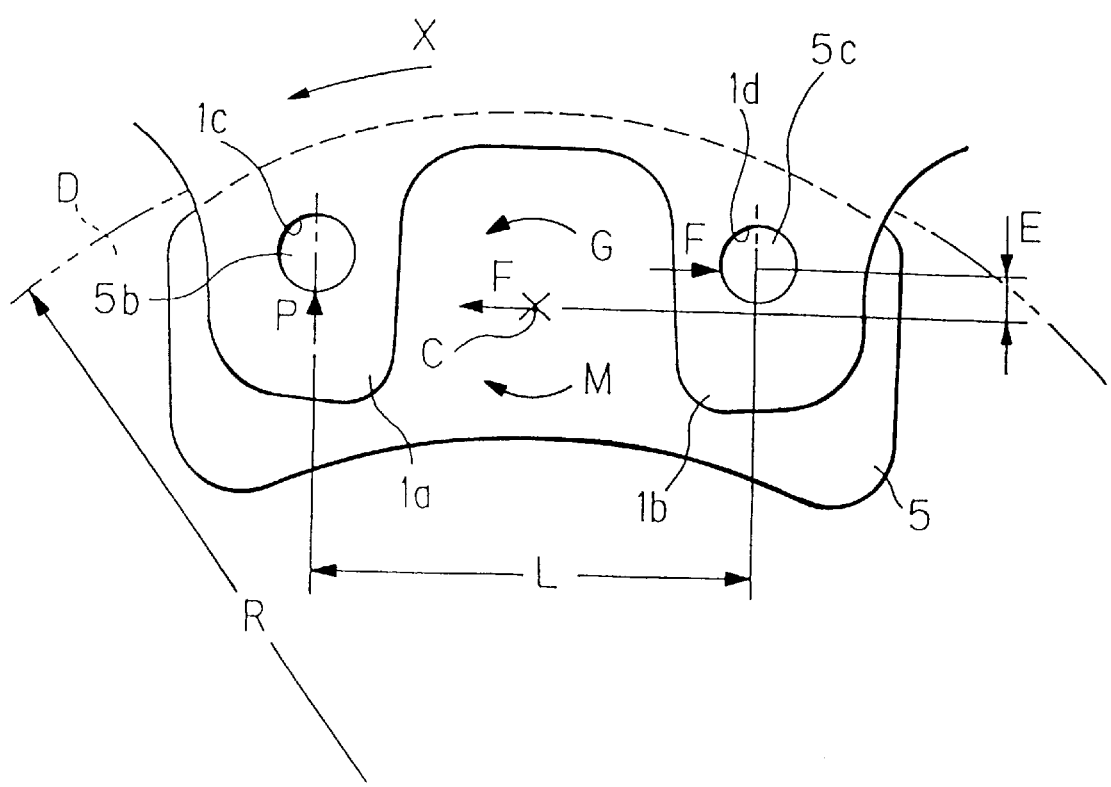
FIG. 3 is a diagram useful in explaining the problems of the conventional disc brake.
Figure 4:
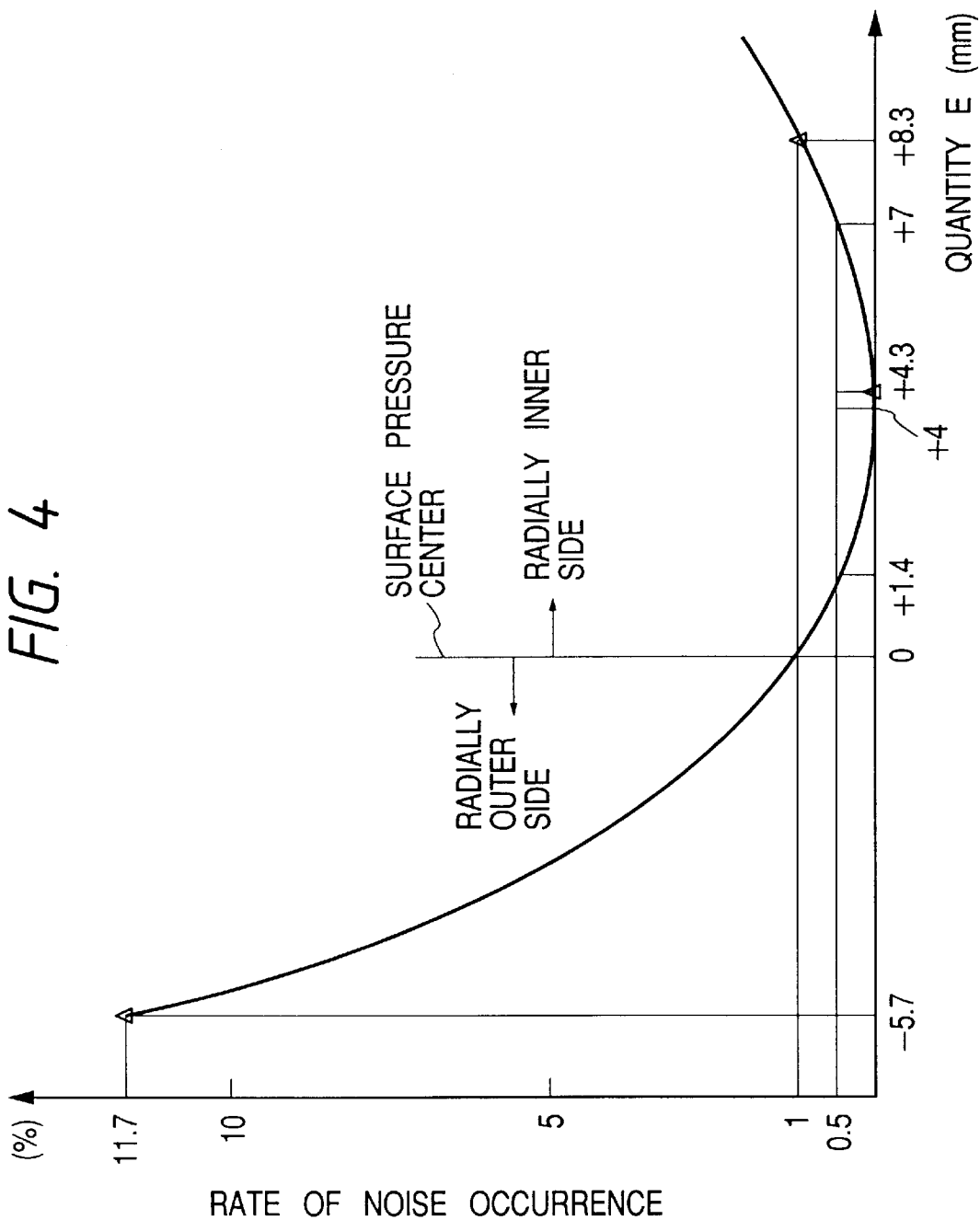
FIG. 4 is a graph showing the useful effects of the present invention.

A variation of a rate of noise occurrence with respect to a quantity E of a deviation of the protrusions of the outer pad and the holes of the caliper pawls from the surface pressure center of the outer pad was measured, and the measurement result was as shown in FIG. 4.

In the measurement, the distance L between the protrusions was 55 mm; the width of the outer pad measured in the radial direction was 37 mm; and a maximum value of the braking force of each of the tested disc brakes was 160 kg. The quantities E of deviations of the protrusions of the outer pad and the holes of the caliper pawls from the surface pressure center of each outer pad were: −5.7, 0, 1.4, 4.0, 4.3, 7.0 and 8.3. In FIG. 4, a minus sign "−" is assigned to the outer side with respect to the surface pressure center, and a plus sign "+", to the radially inner side. The noise generation rate is defined as a rate (%) of generation of noise of 70 dB in sound pressure with respect to the total number of braking motions.

When the deviation quantity E to the radially inner side is 4 mm and 4.3 mm, the noise generation rate is zero (0), and a range where the noise generation rate is 1% or less is 0 to 8.3.

As seen from the measurement result, the generation of noise by the outer pad is substantially completely suppressed.

As the wear of the brake pad progresses, an uneven wear occured at the peripheral part of the brake pad. In this state, when the braking force is small, the surface pressure on the peripheral part of the brake pad is substantially zero. Therefore, the surface pressure center of the brake pad in a state that the braking force is small is shifted to the radially inner side as the wear of the brake pad progresses. When considering this fact, in practical use, it is preferable that the deviation quantity E (at the time of manufacturing, as a matter of course) of the protrusions and the holes to the radially inner side from the surface pressure center C is set within a range from 4.9 mm to 8 mm.

As seen from the above description, the relationship between the noise generation rate and the deviation quantity E is substantially invariable with respect to the distance L between the protrusions, the moment G of the outer pad per se, and the magnitude of the braking force.

Thus, in the present invention, the protrusions of the back plate of the outer pad and the holes of the pawls of the caliper into which the protrusions are fit are located on the radially inner side of the surface pressure center of the outer pad. Therefore, there is no need of increasing the number of parts and manufacturing steps. There is eliminated the use of the shim, which is essential to the conventional disc brake. This entails no work of mounting the shim and reduction of cost to manufacture.

Figure 6:
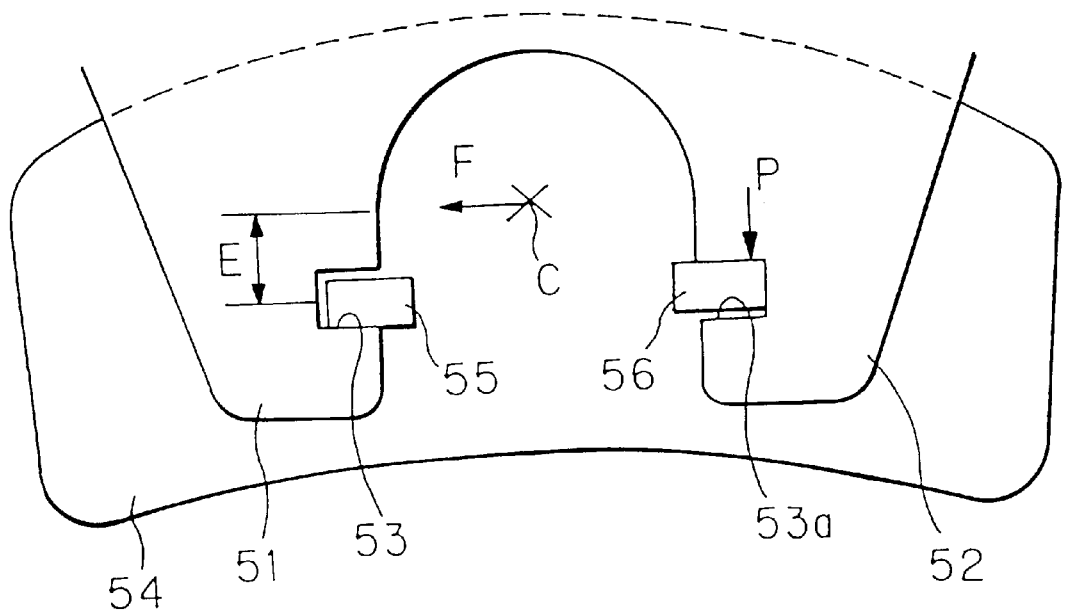
FIG. 6 is a diagram showing another embodiment of a disc brake according to the present invention.

The problem solving means, operation and effects of the present invention have been described on the means for directly supporting the outer pad by means of the pawls of the caliper is constructed with the protrusions of the back plate of the outer pad and the pawls of the caliper. The present invention may also be applied to a disc brake using a supporting mechanism shown in FIG. 6. In the supporting mechanism, cutouts 53 and 53a are formed in the inner sides of pawls 51 and 52 of a caliper. Protrusions 55 and 56 are provided on an outer pad 54. The protrusions 55 and 56 are put in the cutouts 53 and 53a, whereby the outer pad 54 is directly supported by the pawls 51 and 52 of the caliper. In this mechanism, the protrusions 55 and 56 of the outer pad 54 and the cutouts 53 and 53a of the pawls of the caliper are located on the radially inner side of the surface pressure center C of the outer pad.

What is claimed is:

1. A disc brake for engaging a surface of a braking disc, comprising:

a caliper including pawls having engaging parts;

an outer pad including a back plate having protrusions on a rear surface thereof, the outer pad being supported by the pawls with the protrusions engaged with the engaging parts such that a friction surface of the outer pad contacts the surface of the braking disc according to the action of the caliper, wherein the protrusions and the engaging parts are deviated toward a radially inner side with respect to a surface pressure center of the outer pad by a distance of 4±4 mm when the disc brake is manufactured, wherein the position of the protrusions and the engaging parts relative to the surface pressure center suppresses noise.

2. The disc brake according to claim 1, wherein the engaging parts include a pair of holes defined in the caliper.

3. The disc brake according to claim 1, wherein the engaging parts include a pair of holes defined in the caliper on substantially opposite sides of the surface pressure center.

4. A disc brake for engaging a surface of a braking disc having an axis of rotation, comprising:

a caliper including pawls having engaging parts; and an outer pad including a back plate having protrusions on a rear surface thereof, the outer pad being supported by the pawls with the protrusions engaged with the engaging parts such that a friction surface of the outer pad contacts the surface of the braking disc according to the action of the caliper, wherein the protrusions and the engaging parts are disposed toward the axis of rotation as compared to a surface pressure center by a distance of 4±4 mm when the disc brake is manufactured, wherein the position of the protrusions and the engaging parts relative to the surface pressure center suppresses noise.

5. The disc brake according to claim 4, wherein the engaging parts include a pair of holes defined in the caliper.

6. The disc brake according to claim 4, wherein the engaging parts include a pair of holes defined in the caliper on substantially opposite sides of the surface pressure center.

7. A disc brake for engaging a surface of a braking disc, comprising:

a caliper including pawls having engaging parts; and an outer pad including a back plate having protrusions on a rear surface thereof, the outer pad being supported by the pawls with the protrusions engaged with the engaging parts such that a friction surface of the outer pad contacts the surface of the braking disc according to the action of the caliper, wherein the protrusions and the engaging parts are deviated toward a radially inner side with respect to a surface pressure center of the outer pad by a distance between 4.9 mm and 8.0 mm when the disc brake is manufactured, wherein the position of the protrusions and the engaging parts relative to the surface pressure center suppresses noise.

8. The disc brake according to claim 7, wherein the engaging parts include a pair of holes defined in the caliper.

9. The disc brake according to claim 7, wherein the engaging parts include a pair of holes defined in the caliper on substantially opposite sides of the surface pressure center.

10. A disc brake for engaging a surface of a braking disc having an axis of rotation, comprising:

a caliper including pawls having engaging parts; and an outer pad including a back plate having protrusions on a rear surface thereof, the outer pad being supported by the pawls with the protrusions engaged with the engaging parts such that a friction surface of the outer pad contacts the surface of the braking disc according to the action of the caliper, wherein the protrusions and the engaging parts are disposed toward the axis of rotation as compared to a surface pressure center by a distance between 4.9 mm and 8.0 mm when the disc brake is manufactured, wherein the position of the protrusions and the engaging parts relative to the surface pressure center suppresses noise.

11. The disc brake according to claim 10, wherein the engaging parts include a pair of holes defined in the caliper.

12. The disc brake according to claim 10, wherein the engaging parts include a pair of holes defined in the caliper on substantially opposite sides of the surface pressure center.

* * * * *